United States Patent
Ye

(10) Patent No.: US 12,233,845 B2
(45) Date of Patent: Feb. 25, 2025

(54) CONTROL SYSTEM AND METHOD FOR MITIGATING DRIVELINE TORQUE SPIKES IN ELECTRIC VEHICLES

(71) Applicant: GM GLOBAL TECHNOLOGY OPERATIONS LLC, Detroit, MI (US)

(72) Inventor: Shaochun Ye, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 397 days.

(21) Appl. No.: 17/734,235

(22) Filed: May 2, 2022

(65) Prior Publication Data
US 2023/0347867 A1 Nov. 2, 2023

(51) Int. Cl.
*B60W 20/15* (2016.01)
*B60W 10/08* (2006.01)

(52) U.S. Cl.
CPC ............ *B60W 20/15* (2016.01); *B60W 10/08* (2013.01); *B60L 2240/423* (2013.01); *B60W 2710/085* (2013.01)

(58) Field of Classification Search
CPC .................. B60W 20/15; B60W 10/08; B60W 2710/085; B60L 2240/423
See application file for complete search history.

(56) References Cited

U.S. PATENT DOCUMENTS

| | | | |
|---|---|---|---|
| 10,112,598 B1* | 10/2018 | Johri | B60K 6/387 |
| 2015/0232093 A1* | 8/2015 | Fairgrieve | B60W 10/18 701/90 |
| 2016/0040734 A1* | 2/2016 | Tamai | B60W 30/02 903/946 |
| 2018/0072306 A1* | 3/2018 | Yamazaki | B60K 6/54 |
| 2019/0135103 A1* | 5/2019 | Kuze | B60K 6/543 |
| 2019/0193577 A1* | 6/2019 | Kaneko | B60K 23/0808 |
| 2020/0247244 A1* | 8/2020 | Yamane | B60L 3/102 |
| 2022/0169256 A1* | 6/2022 | Beal | B60W 40/068 |

* cited by examiner

*Primary Examiner* — Rachid Bendidi
*Assistant Examiner* — Nada Mahyoob Alqaderi
(74) *Attorney, Agent, or Firm* — Quinn IP Law

(57) ABSTRACT

A control system and method for mitigating driveline torque spikes in an electric vehicle is contemplated. The driveline torque spikes may be mitigated with a motor spike torque command generated in response to a wheel acceleration of a wheel of the vehicle exceeding a spike threshold. The motor spike torque command may be configured for controlling an electric motor of the vehicle to mitigate the driveline torque spike in a driveline configured to connect the motor to the wheel.

20 Claims, 2 Drawing Sheets

CONTROL SYSTEM AND METHOD FOR MITIGATING DRIVELINE TORQUE SPIKES IN ELECTRIC VEHICLES

INTRODUCTION

The present disclosure relates to control systems and methods for mitigating driveline torque spikes when an electric vehicle experiences a relatively sudden change in operating conditions, such as in response to the vehicle traveling between surfaces having differing coefficients of friction.

Electric vehicles typically rely upon some type of driveline to convey rotational force from an electric motor to one or more wheels. Electric vehicles travel across surfaces of many varieties and periodically experience driveline torque spikes when crossing a boundary between surfaces having differing coefficients of friction, such as when crossing between a low friction surface and a high friction surface or vice versa. The torque spikes associated with crossing boundaries between disparate surfaces may stem from wheel slip inducing an abrupt imbalance in a relative relationship of the rotational forces acting on each of the motor and the wheels. Such torque spikes may result from a rapid decrease in wheel speed when crossing a boundary from a low friction to a high friction surface and vice versa from a rapid increase in wheel speed when crossing a boundary from a high friction to a low friction surface. Similar torque spikes may be associated with a panic break event that occurs as a result of a vehicle operator engaging a braking system in such a manner that the wheel speed drops suddenly and dramatically.

SUMMARY

Disclosed herein is a control system and method of mitigating driveline torque spikes for an electric vehicle. The capability to mitigate driveline torque spikes may be beneficial in limiting undesirable strain on a driveline and other mechanisms when a vehicle crosses boundaries between surfaces having differing coefficients of friction, experiences panic breaking, and/or is otherwise subject to events producing wheel slip or other rapid wheel speed changes.

One aspect of the present disclosure relates to a control system for an electric vehicle. The system may include a motor controller configured to control a motor of the vehicle according to one or more of a plurality of torque commands and a motor spike controller configured to generate a motor spike torque command as one of the plurality of torque commands. The motor spike torque command may be configured to mitigate driveline torque spikes in a driveline configured to connect the motor to a wheel of the vehicle.

The system may include the motor spike controller being configured to generate the motor spike torque command according to a torque spike equation. The torque spike equation may be represented as:

$$T_m = J_m \times \dot{N}_w \times \text{Ratio}$$

wherein $T_m$ is the motor spike torque command, $J_m$ is a motor inertia of the motor, $\dot{N}_w$ is a wheel acceleration of the wheel, and Ratio is a constant representing a speed ratio between the motor and the one or more driven wheels.

The system may include the motor spike controller being configured to generate the motor spike torque command in response to an ice clunk event occurring as a result of the vehicle crossing from a first surface to a second surface. The first surface may have a first friction and the second surface having a second friction differing from the first friction by a predefined amount.

The system may include the motor spike controller being configured to generate the motor spike torque command in response a panic braking event occurring as a result of a brake on the vehicle causing wheel speed to decelerate faster than a predefined rate.

The system may include the motor spike controller being configured to generate the motor spike torque command as a feedforward control.

One aspect of the present disclosure relates to a control method for mitigating driveline torque spikes in an electric vehicle. The method may include generating a motor spike torque command in response to a wheel acceleration of a wheel of the vehicle exceeding a spike threshold. The motor spike torque command may be configured for controlling an electric motor of the vehicle to mitigate the driveline torque spike in a driveline configured to connect the motor to the wheel.

The method may include generating the motor spike torque command according to a torque spike equation. The torque spike equation may be represented as:

$$T_m = J_m \times \dot{N}_w \times \text{Ratio}$$

wherein $T_m$ is the motor spike torque command, $J_m$ is a motor inertia of the motor, $\dot{N}_w$ is a wheel acceleration of the wheel, and Ratio is a constant representing a speed ratio between the motor and the one or more driven wheels.

The method may include generating a wheel slip torque command based on a wheel speed measured at the wheel. The wheel slip torque command may be configured for controlling the motor to mitigate a wheel slip of the wheel.

The method may include generating a wheel flare torque command based on a transmission output speed of an output of a transmission included as part of the driveline. The wheel flare torque command may be configured for controlling the motor to mitigate a wheel flare of the wheel.

The method may include a motor controller configured to arbitrate between commanding the motor according to one of the motor spike torque command, the wheel slip torque command, and the wheel flare torque.

The method may include a wheel slip controller configured to generate wheel slip torque command, a wheel flare controller configured to generate wheel flare torque command, and a motor spike controller configured to generate the motor spike torque command.

The method may include the motor spike controller generating the motor spike torque command in response to the wheel speed being greater than a wheel speed threshold or the output of the transmission being greater than a predetermined output acceleration threshold.

The method may include generating the motor spike torque command as a feedforward control.

The method may include generating each of the wheel slip torque command and the wheel flare torque command as a feedback control.

The method may include generating the motor spike torque command such that a motor inertia of the motor matches in speed with a wheel inertia of the wheel.

The method may include generating the motor spike torque command to control a motor speed of the motor to approximate a wheel speed of the wheel.

One aspect of the present disclosure relates to a control system for an electric vehicle. The system may include a wheel slip controller configured to control wheel slip based on a wheel speed measured at a wheel of the vehicle, a wheel flare controller configured to control wheel flare based on a transmission output speed of an output of a transmission included as part of a driveline of the vehicle, and a motor spike controller configured to control driveline torque spikes based on a wheel acceleration of the wheel and a motor inertia of a motor connected via the driveline to the wheel.

The system may include the motor spike controller being configured to generate a motor spike torque command for controlling the motor to mitigate the driveline torque spike.

The system may include the motor spike controller is configured to generate the motor spike torque command according to a torque spike equation. The torque spike equation may be represented as:

$$T_m = J_m \times \dot{N}_w \times \text{Ratio}$$

wherein $T_m$ is the motor spike torque command, $J_m$ is a motor inertia of the motor, $\dot{N}_w$ is a wheel acceleration of the wheel, and Ratio is a constant representing a speed ratio between the motor and the one or more driven wheels.

The system may include a motor controller configured to arbitrate between using the wheel slip controller, the wheel flare controller, and the motor spike controller to control the motor.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The above features and advantages and other features and advantages of the present teachings are readily apparent from the following detailed description of the modes for carrying out the present teachings when taken in connection with the accompanying drawings. It should be understood that even though the following Figures embodiments may be separately described, single features thereof may be combined to additional embodiments.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
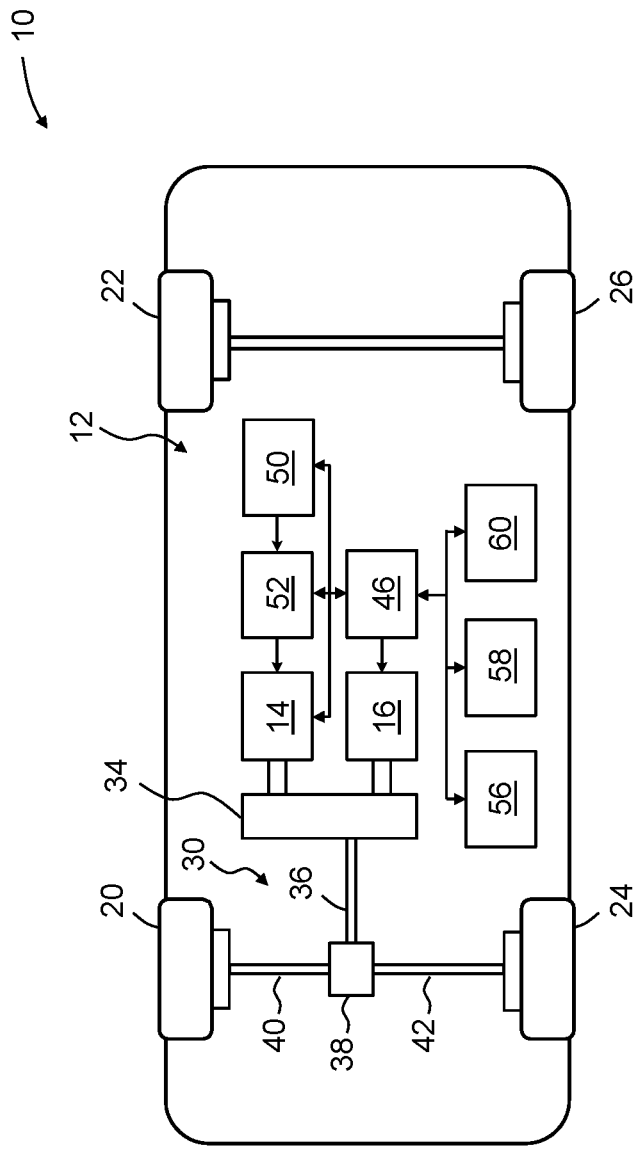
FIG. 1 illustrates a schematic view of a hybrid electric vehicle having a control system for mitigating driveline torque spikes in accordance with one non-limiting aspect of the present disclosure.

FIG. 1 illustrates a schematic view of a hybrid electric vehicle 10 having a control system 12 for mitigating driveline torque spikes in accordance with one non-limiting aspect of the present disclosure. The vehicle 10 is illustrated for exemplary non-limiting purposes as being a hybrid of the type having an internal combustion engine (ICE) 14 and an electric motor 16 to cooperatively provide rotational force/torque to one or more of a plurality of wheels 20, 22, 24, 26. The vehicle 10 is shown to include a driveline 30 configured to connect the ICE 14 and the motor 16 to the front wheels 20, 24. The driveline 30 may include a transmission 34, a driveshaft 36, a differential 38, axles 40, 42, and/or other componentry to facilitate conveying rotative force from the ICE 14 and/or the motor 16 to the wheels 20, 22, 24, 26. The vehicle 10 is predominately described as a two-wheel drive automobile for exemplary non-limited purposes as the present disclosure fully contemplates its use and application with four-wheel drive automobiles and other, non-automobile types of vehicles.

A motor controller 46 may be configured to generate control signals associated with directing and otherwise implementing desired control of the ICE 14 and/or the motor 16. One or more battery packs 50 may be configured to supply DC power to a DC-AC inverter 52, which then supplies AC power to the electric motor 16 as directed by the motor controller 46. The vehicle 10 is shown to include the ICE 14 for exemplary purposes as the present disclosure fully contemplates its use and application with battery-only types of vehicles, i.e., vehicles that rely solely on the motor 16 for propulsion. The motor controller 46 may be considered as a motor controller unit (MCU), a main controller, an engine control unit (ECU), and/or other type of controller configured to facilitate controlling a number of vehicle operations according to the processes contemplated herein.

The motor controller 46 may be configured to interact directly with vehicle components and/or through a vehicle network or bus to facilitate exchanging information, data, commands, etc. with systems, sensors, and other elements within the vehicle 10. One non-limiting aspect of the present disclosure contemplates the motor controller 46 being configured to interact with additional controllers 56, 58, 60 or to itself include the additional controllers 56, 58, 60. The controllers 46, 56, 58, 60 may be functional constructs associated with activities resulting from one or more processors executing a plurality of non-transitory instructions stored on a computer readable storage medium, e.g., the operations, processes, commands, functions, etc. of each controller 46, 56, 58, 60 may be defined according to separate non-transitory instructions associated therewith. The controllers 46, 56, 58, 60, as such, are presented separately for non-limiting purposes in order to demarcate contemplated control functionality.

The motor controller 46 may be the final arbitrator of torque commands used to control to the ICE 14 and/or the motor 16. The torque commands may be instructions or other information provided from the motor controller 46 for purposes of directing propulsion of the vehicle 10. While the contemplated control may be implemented in conjunction with use of the ICE 14, the present disclosure is predominantly described with respect to the motor controller 46 arbitrating between various torque commands of the controllers 56, 58, 60 for purposes of selecting one or more of the torque commands to control operation of the motor 16, which may occur independently of or in cooperation with the ICE 14. In this exemplary scenario, the controller 56 may be a wheel slip controller configured to generate a wheel slip torque command, the controller 58 may be a wheel flare controller configured to generate a wheel flare torque command, and the controller 60 may be configured as a motor spike controller configured to generate a motor spike torque command. The motor controller 46 may be tasked with arbitrating between one or more of the wheel slip, wheel flare, and motor spike torque commands for purposes of directing operation of the motor 16 and/or other components associated therewith, e.g., directing operations of the battery 50, the inverter 52, etc.

The wheel slip and wheel flare controllers 56, 58 may be closed-loop type of controllers configured to facilitate generating corresponding torque commands. The wheel slip and wheel flare controllers 56, 58 may be generally characterized as control functions focused on preventing the wheels 20, 22, 24, 26 from slipping, i.e., to maximize tractive force between the wheel 20, 22, 24, 26 and surface of travel. The wheel slip torque command generated with the wheel slip controller 56 may be based on a wheel speed measured at one or more of the wheels 20, 22, 24, 26 and configured for controlling the motor 16 to mitigate wheel slip. The wheel flare torque command generated with the wheel flare controller 58 may be based on a transmission output speed of an output of the transmission 34 and configured for controlling the motor 16 to mitigate a wheel flare of the wheels 20, 22, 24, 26.

The motor spike controller 60 may be an open-loop type of controller configured to generate the motor spike torque command as a feedforward type of command. The feedforward nature of the motor spike controller 60 may be beneficial in providing a quicker response to wheel slippage than the wheel slip and flare controllers 56, 58 and/or a response independent of feedback type of loop such that it can be quickly implemented. One non-limiting aspect of the present disclosure contemplates the motor spike controller 60 being configured to mitigate driveline torque spikes within the driveline 30. Driveline torque spikes may occur under various circumstances and may be generally considered as a temporary or short-lived event whereby a quick response may be beneficial in limiting strain on the driveline 30 or other systems of the vehicle 10.

Driveline torque spikes may occur, for example, in response to an ice clunk event or when the vehicle 10 crosses a boundary between surfaces having coefficients of friction differing by a predefined amount. Driveline torque spikes may result from a rapid decrease in wheel speed when crossing a boundary from a low friction to a high friction surface and vice versa from a rapid increase in wheel speed when crossing a boundary from a high friction to a low friction surface. Driveline torque spikes may also occur as a result of a panic break event when a vehicle operator engages a braking system in such a manner that the wheel speed suddenly and dramatically drops faster than a predefined rate. Driveline torque spikes may be considered as an imbalance between the motor 16 and the driven wheels 20, 24 associated with the motor 16 and/or the driven wheels 20, 24 operating in a manner that disrupts speed ratios, gearing ratios, and/or other design ratios desired for typical operation of the driveline 30.

To limit the effect of the imbalance and/or to mitigate the amount of torque spike, one non-limiting aspect of the present disclosure contemplates the motor spike controller 60 generating the motor spike torque command in a manner sufficient for using the motor 16 as an actuator whereby the actuator effectively imparts or consumes energy/force to/from the driveline 30 to mitigate the torque spikes. The motor spike torque command may optionally be used in this manner to inertia match and/or speed match an inertia and/or speed of the motor 16 with an inertia and/or speed of the driven wheels 20, 24 such that the two (motor and wheel) rotate with essentially the same pace. The matching may take into consideration componentry of the driveline 30, i.e., ratios and gearing associated with the transmission 34, driveshaft 36, differential 38, etc. The motor spike torque command may be generated in an attempt to quickly ward off or limit shaft twist of the driveshaft 36 and the axles 40, 42, such as to re-balance those and the other components of the driveline 30 to a state preceding the torque spike event.

The motor spike torque command may be implemented in an attempt to better balance tortional forces in an effort to quickly ameliorate disparity between the driven wheels 20, 24 and the motor 16 occurring as a result of the torque spike event. One non-limiting aspect of the present disclosure contemplates generating the motor spike torque command according to a torque spike equation. The torque spike equation may be represented as:

$$T_m = J_m \times \dot{N}_w \times \text{Ratio}$$

wherein $T_m$ is the motor spike torque command, $J_m$ is a motor inertia of the motor, $\dot{N}_w$ is a wheel acceleration of the wheel, and Ratio is a constant representing a speed ratio between the motor 16 and the one or more driven wheels 20, 24. The motor inertia ($J_m$) may be a physical value or constant associated with material properties, sizing, and other design characteristics of the motor 16. The wheel acceleration ($\dot{N}_w$) may be a calculated value based on a wheel speed sensor at one of the driven wheels 20, 24 assessing a rate of change, e.g., the rate of change associated with the wheel speed suddenly increasing or decreasing due to ice clunk, panic braking, disparate frictional surfaces, etc. The speed ratio (Ratio) may be a physical value or constant associated with material properties, sizing, and other design characteristics of the driveline 30, e.g., a value derived according to the gearing, step-down, mechanical advantages, etc. associated with interconnecting the wheels 20, 24 with the motor 16.

Figure 2:
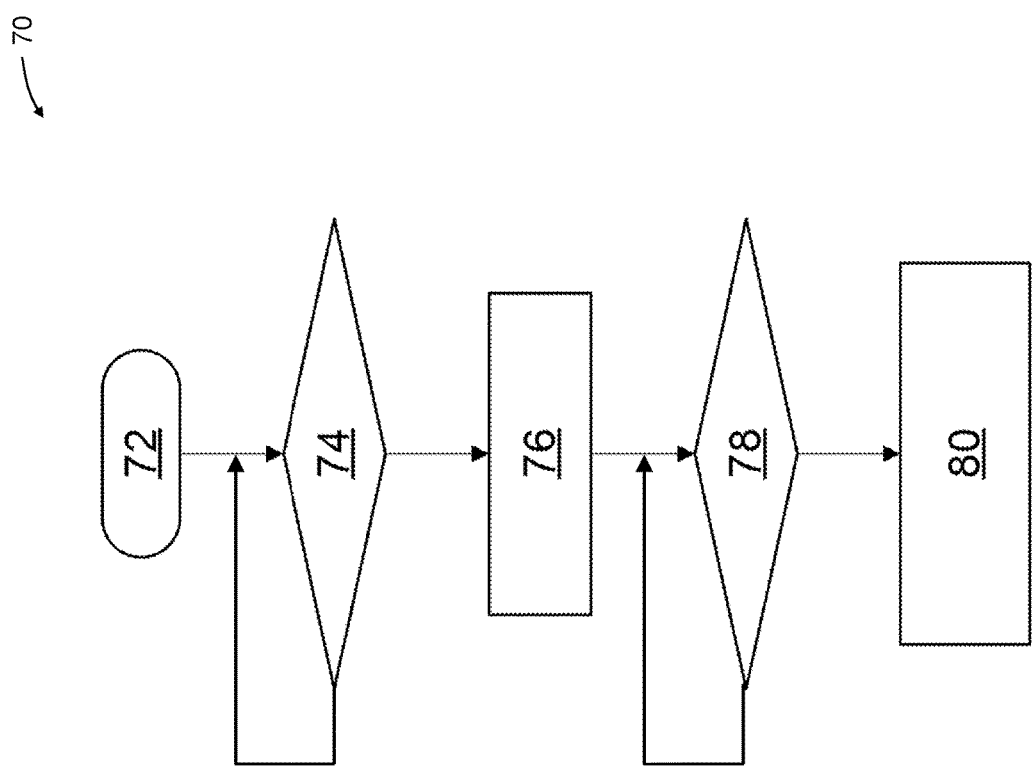
FIG. 2 illustrates a flowchart of a control method for mitigating driveline torque spike in an electric vehicle in accordance with one non-limiting aspect of the present disclosure.

FIG. 2 illustrates a flowchart 70 of a control method for mitigating driveline torque spike in an electric vehicle in accordance with one non-limiting aspect of the present disclosure. The method may improve operation of an electric vehicle by mitigating driveline torque spikes, and thereby the undesirable strain on a driveline and other mechanisms, such as when a vehicle crosses boundaries between surfaces having differing coefficients of friction, experiences panic breaking, and/or is otherwise subject to events producing wheel slip or other rapid wheel speed changes. The method, and associated operations, processes, functions, commands, etc., may be facilitated with a controller having a corresponding set of non-transitory instructions stored on a computer readable storage medium such that, when executed with a processor, the non-transitory instructions are sufficient to facilitate mitigating driveline torque spike in the manner contemplated herein, i.e., by generating a motor spike torque command for use by a motor controller to control a motor to mitigate driveline torque spikes.

Block 72 relates to instigating the contemplated control strategy and methodology. This may include a motor controller or other vehicle controller initiating its operation or otherwise collecting data according to processes needed to identify various vehicle operating states and related operator demand. One non-limiting aspect of the present disclosure contemplates the method being implemented in accordance with wheel slip and wheel flare controls such that the initialization process may include the motor controller initializing each of a wheel slip controller, a wheel flare controller, and a motor spike controller to respectively generate a wheel slip torque command, a wheel flare torque command, and the motor spike torque command. The motor controller may be configured to receive each of these torque commands and to arbitrate corresponding control of the motor, i.e., to select one or more of the torque commands for use in controlling the motor and/or the components associated therewith (e.g., battery, inverter, etc.).

Block 74 relates to determining whether either one of a wheel slip controller and/or a wheel flare controller are actively being engaged to respectively generate the wheel slip and/or wheel flare torque commands. This assessment may be useful in identifying conditions or events where the vehicle is beginning to experience wheel slippage or conditions when will slippage is likely or possible to occur in the near future, such as when the wheel speed is greater than a wheel speed threshold or the output of the transmission is greater than a predetermined output acceleration threshold. Integrating generation of the motor spike torque command with the torque commands of the wheel slip and flare controllers may be beneficial in limiting programming and other processing associated with the implementation thereof. In other words, rather than undertaking programming or otherwise generating procedures for detecting events preceding a torque spike event or making independent measurements, the motor spike controller may more simply identify such a need from binary flags set for the wheel slip and flare controllers. The generation of the motor spike torque command, alternatively, may be perpetually generated throughout vehicle operations and provided continuously to the motor controller. This may be beneficial in ameliorating time delays associated with triggering generation of the motor spike torque command and its deliverance to the motor controller. The motor controller may be correspondingly configured to ignore the motor spike torque command until conditions indicate a need for the use thereof.

Block 76 relates to calculating a wheel acceleration for one or more of the wheels being driven by the motor. The wheel acceleration may be based on a wheel speed measured with a sensor positioned at the corresponding wheel, such as with a sensor associated with an antilock braking system (ABS).

Block 78 relates to determining whether the wheel acceleration exceeds a predefined motor spike threshold. The motor spike threshold may be a design parameter set according to situations where driveline torque spikes may be possible. The wheel acceleration threshold, for example, may be specified with a sufficient margin such that the motor spike threshold is less than that which would actually induce a driveline torque spike. The motor spike threshold may be calculated as an absolute value such that the threshold may be exceeded with a sufficient amount of acceleration or deceleration. The use of the wheel acceleration threshold may be beneficial in comparison to a wheel speed threshold or a transmission speed threshold, i.e., the thresholds utilized by the wheel slip and flare controllers, due to acceleration being a more accurate representation for driveline torque spikes or conditions likely to cause shaft twists.

Block 80 relates to generating the motor spike torque command according to a torque spike equation. The torque spike equation may be represented as:

$$T_m = J_m \times \dot{N}_w \times \text{Ratio}$$

wherein $T_m$ is the motor spike torque command, $J_m$ is a motor inertia of the motor, $\dot{N}_w$ is a wheel acceleration of the wheel, and Ratio is a constant representing a speed ratio between the motor and the one or more driven wheels. The motor inertia ($J_m$) may be a physical value or constant associated with material properties, sizing, and other design characteristics of the motor. The wheel acceleration ($\dot{N}_w$) may be a calculated value based on a wheel speed sensor at one of the driven wheels assessing a rate of change, e.g., the rate of change associated with the wheel speed suddenly increasing or decreasing due to ice clunk, panic braking, disparate frictional surfaces, etc. The speed ratio (Ratio) may be a physical value or constant associated with material properties, sizing, and other design characteristics of the driveline.

The present disclosure may be embodied in many different forms. Representative examples are shown in the various drawings and described herein in detail as non-limiting representations of the disclosed principles. To that end, elements and limitations described above, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the disclosure, as defined by the claims. Spatially relative terms, such as "inner," "outer," "beneath," "below," "lower," "above," "upper," and the like, may be used herein for ease of description to describe one element or feature's relationship to another element(s) or feature(s) as illustrated in the drawing figures. Spatially relative terms may be intended to encompass different orientations of the device or system in use or operation in addition to the orientation depicted in the drawing figures.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A control system for an electric vehicle, the system comprising:
    a motor controller configured to control a motor of the vehicle according to one or more of a plurality of torque commands; and
    a motor spike controller configured to generate a motor spike torque command as one of the plurality of torque commands, the motor spike torque command being configured to mitigate driveline torque spikes in a driveline configured to connect the motor to a wheel of the vehicle;
    wherein the motor spike controller is configured to generate the motor spike torque command according to a torque spike equation, the torque spike equation being represented as:

$$T_m = J_m \times \dot{N}_w \times \text{Ratio}$$

wherein $T_m$ is the motor spike torque command, $J_m$ is a motor inertia of the motor, $\dot{N}_w$ is a wheel acceleration of the wheel, and Ratio is a constant representing a speed ratio between the motor and the wheel.

2. The system according to claim 1, wherein the motor spike controller is configured to generate the motor spike torque command in response to an ice clunk event occurring as a result of the vehicle crossing from a first surface to a second surface, the first surface having a first friction and the second surface having a second friction, the second friction differing from the first friction by a predefined amount.

3. The system according to claim 1, wherein the motor spike controller is configured to generate the motor spike torque command in response a panic braking event occurring as a result of a brake on the vehicle causing wheel speed to decelerate faster than a predefined rate.

4. The system according to claim 1, wherein the motor spike controller is configured to generate the motor spike torque command as a feedforward control.

5. A control method for mitigating driveline torque spikes in an electric vehicle, the method comprising:
    generating a motor spike torque command in response to a wheel acceleration of a wheel of the vehicle exceeding a spike threshold, the motor spike torque command being configured for controlling an electric motor of the vehicle to mitigate the driveline torque spike in a driveline configured to connect the motor to the wheel; and
    generating the motor spike torque command according to a torque spike equation, the torque spike equation being represented as:

$$T_m = J_m \times \dot{N}_w \times \text{Ratio}$$

wherein $T_m$ is the motor spike torque command, $J_m$ is a motor inertia of the motor, $\dot{N}_w$ is the wheel acceleration, Ratio is a constant representing a speed ratio between the motor and the wheel.

6. The method according to claim 5, further comprising generating a wheel slip torque command based on a wheel speed measured at the wheel, the wheel slip torque command being configured for controlling the motor to mitigate a wheel slip of the wheel.

7. The method according to claim 6 further comprising generating a wheel flare torque command based on a transmission output speed of an output of a transmission included as part of the driveline, the wheel flare torque command being configured for controlling the motor to mitigate a wheel flare of the wheel.

8. The method according to claim 7 further comprising a motor controller configured to arbitrate between commanding the motor according to one of the motor spike torque command, the wheel slip torque command, and the wheel flare torque.

9. The method according to claim 8 further comprising a wheel slip controller configured to generate wheel slip torque command, a wheel flare controller configured to generate wheel flare torque command, and a motor spike controller configured to generate the motor spike torque command.

10. The method according to claim 9 further comprising the motor spike controller generating the motor spike torque command in response to the wheel speed being greater than a wheel speed threshold or the output of the transmission being greater than a predetermined output acceleration threshold.

11. The method according to claim 10 further comprising generating the motor spike torque command as a feedforward control.

12. The method according to claim 11 further comprising generating each of the wheel slip torque command and the wheel flare torque command as a feedback control.

13. The method according to claim 5 further comprising generating the motor spike torque command such that a motor inertia of the motor matches in speed with a wheel inertia of the wheel.

14. The method according to claim 5 further comprising generating the motor spike torque command to control a motor speed of the motor to approximate a wheel speed of the wheel.

15. A control system for an electric vehicle, the system comprising:
- a wheel slip controller configured to control wheel slip based on a wheel speed measured at a wheel of the vehicle;
- a wheel flare controller configured to control wheel flare based on a transmission output speed of an output of a transmission included as part of a driveline of the vehicle; and
- a motor spike controller configured to control driveline torque spikes based on a wheel acceleration of the wheel and a motor inertia of a motor connected via the driveline to the wheel;
- wherein the motor spike controller is configured to generate a motor spike torque command for controlling the motor to mitigate the driveline torque spike; and
- wherein the motor spike controller is configured to generate the motor spike torque command according to a torque spike equation, the torque spike equation being represented as:

$$T_m = J_m \times \dot{N}_w \times \text{Ratio}$$

wherein $T_m$ is the motor spike torque command, $J_m$ is a motor inertia of the motor, $\dot{N}_w$ is the wheel acceleration, and Ratio is a constant representing a speed ratio between the motor and the wheel.

16. The system according to claim 15, further comprising the motor controller configured to arbitrate between using the wheel slip controller, the wheel flare controller, and the motor spike controller to control the motor.

17. The system according to claim 16, further comprising the motor controller configured to generate a wheel slip torque command based on a wheel speed measured at the wheel, the wheel slip torque command being configured for controlling the motor to mitigate a wheel slip of the wheel.

18. The system according to claim 17, further comprising the motor controller configured to generate a wheel flare torque command based on a transmission output speed of an output of a transmission included as part of the driveline, the wheel flare torque command being configured for controlling the motor to mitigate a wheel flare of the wheel.

19. The system according to claim 18, further comprising:
- the motor spike controller configured to generate the motor spike torque command as a feedforward control; and
- the motor controller configured to generate each of the wheel slip torque command and the wheel flare torque command as a feedback control.

20. The system according to claim 19, further comprising the motor spike controller configured to generate the motor spike torque command such that a motor inertia of the motor matches in speed with a wheel inertia of the wheel.

* * * * *